US011151317B1

(12) United States Patent
Singh et al.

(10) Patent No.: US 11,151,317 B1
(45) Date of Patent: Oct. 19, 2021

(54) CONTEXTUAL SPELLING CORRECTION SYSTEM

(71) Applicant: Amazon Technologies, Inc., Seattle, WA (US)

(72) Inventors: Saurabh Kumar Singh, Seattle, WA (US); Sichen Zhao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 16/261,306

(22) Filed: Jan. 29, 2019

(51) Int. Cl.
*G06F 40/232* (2020.01)
*G06F 40/242* (2020.01)
G06F 40/20 (2020.01)

(52) U.S. Cl.
CPC .......... *G06F 40/232* (2020.01); *G06F 40/242* (2020.01); *G06F 40/20* (2020.01)

(58) Field of Classification Search
CPC .... G06F 40/232; G06F 16/951; G06F 40/242; G06F 40/247; G06F 16/3322; G06F 16/9535; G06F 40/284; G06F 40/30; G06F 40/40; G06F 16/24
See application file for complete search history.

(56) References Cited

U.S. PATENT DOCUMENTS

| | | | | |
|---|---|---|---|---|
| 8,402,032 B1* | 3/2013 | Brunsman | ............... | G06F 16/24 707/748 |
| 9,037,967 B1* | 5/2015 | Al-Jefri | ................. | G06F 40/232 715/257 |
| 9,317,606 B1* | 4/2016 | Nayak | .................. | G06F 16/951 |
| 10,380,210 B1* | 8/2019 | Lai | ........................ | G06F 16/9535 |
| 10,380,248 B1* | 8/2019 | Lai | ........................ | G06F 40/284 |
| 10,394,901 B2* | 8/2019 | Cao | ..................... | G06F 16/3346 |
| 10,579,729 B2* | 3/2020 | Gliozzo | ............... | G06F 16/3322 |
| 2008/0195940 A1* | 8/2008 | Gail | ....................... | G06F 40/232 715/257 |
| 2009/0055381 A1* | 2/2009 | Wu | ....................... | G06F 40/258 |
| 2010/0180198 A1* | 7/2010 | Iakobashvili | ......... | G06F 40/232 715/257 |
| 2010/0286979 A1* | 11/2010 | Zangvil | ................... | G06F 40/40 704/9 |
| 2011/0197128 A1* | 8/2011 | Assadollahi | .......... | G06F 3/0237 715/259 |

(Continued)

OTHER PUBLICATIONS

Reynaert, Martin. "Text induced spelling correction." COLING 2004: Proceedings of the 20th International Conference on Computational Linguistics. 2004. (Year: 2004).*

*Primary Examiner* — Richemond Dorvil
*Assistant Examiner* — Mark Villena
(74) *Attorney, Agent, or Firm* — Knobbe, Martens, Olson & Bear, LLP

(57) ABSTRACT

Contextual spelling methods and systems are provided that utilize natural language processing and n-gram frequencies to group documents into logical groups and to provide spelling correction suggestions. For example, a contextual spelling correction system may receive a set of documents, group the documents into separate logical groups, generate dictionaries associated with the logical groups, receive a user input, determine scores for potential spelling correction suggestions regarding the user input, and provide spelling correction suggestions based at least partly on the dictionaries associated with the logical groups.

20 Claims, 6 Drawing Sheets

(56) References Cited

U.S. PATENT DOCUMENTS

| | | | | |
|---|---|---|---|---|
| 2012/0310626 A1* | 12/2012 | Kida | .................... | G06F 40/232 |
| | | | | 704/8 |
| 2013/0144592 A1* | 6/2013 | Och | ....................... | G06F 40/40 |
| | | | | 704/2 |
| 2016/0085742 A1* | 3/2016 | Mahmud | ............... | G06F 40/242 |
| | | | | 704/9 |
| 2018/0300315 A1* | 10/2018 | Leal | .................... | G06F 40/268 |
| 2018/0341980 A1* | 11/2018 | Garg | ................ | G06Q 30/0277 |

* cited by examiner

CONTEXTUAL SPELLING CORRECTION SYSTEM

BACKGROUND

A user may intentionally utilize a word that does not conform to traditional spelling norms. For example, a project supervisor may keep multiple groups of documents outlining new projects with unique project names that would not appear in a typical dictionary. Such unique words or unusual spellings may be recognized as errors by traditional spellcheck systems. Because manually adding an exception for each and every possible iteration of a word would be prohibitively expensive in terms of labor, time, and cost, it is desirable to teach a computing system to recognize proper spelling given a specific domain or corpus of documents. Traditional spellcheck approaches perform word-by-word comparison from a curated list of words in a dictionary.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
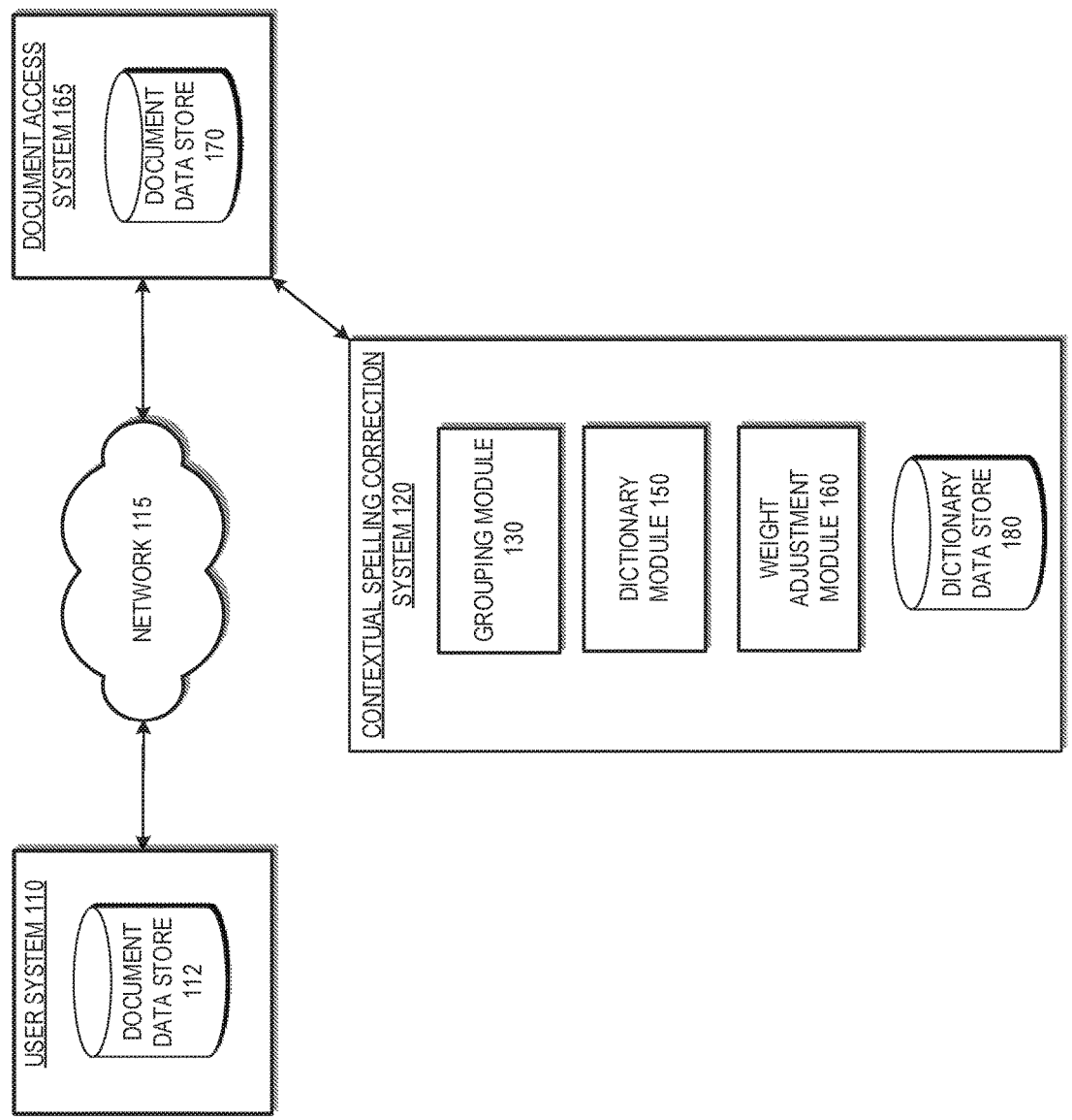
FIG. 1 is an illustrative networked environment and system architecture of a contextual spelling correction system, according to some embodiments.

Aspects of the present disclosure relate to utilizing natural language processing techniques to cluster documents into logical groups and provide proper contextual spelling suggestions in view of spellings contained in the logical groups. Providing contextual spelling suggestions given a searchable domain of documents may be accomplished in different manners, such as using different algorithms, different natural language processing techniques, and/or different tracking methodologies, as will be further described below.

As will be described herein, a contextual spelling correction system may receive a set of documents, group the documents into logical groups by applying natural language techniques and/or tracking word frequencies, generate one or more dictionaries associated with each of the logical groups, and assign a weight for each dictionary. The contextual spelling correction system may then receive a user input query, search for a relevant logical group of documents within the entire searchable domain, assign weights to the dictionaries associated with the relevant logical group, and output a spelling correction suggestion in view of the dictionaries specific to the relevant logical group. As will further be discussed below, the contextual spelling correction system may divide the method and processes among various modules or system components.

The task of detecting correct spelling in a user input query according to previously used methods typically involves comparing each individual word in the query to an individual word stored in a dictionary database to find an exact match. While this approach may successfully identify correct spellings for commonly spelled words in a given language, the approach fails to successfully identify spellings that intentionally deviate from common spellings (e.g., proper nouns that are puns of commonly spelled words). For example, word-by-word comparison of "Analytiks" may generate a spelling error notification because a traditional dictionary may compare it to "analytics." However, in a certain context, such as within a company that has code-named a corporate project as "Analytiks," it is desirable for a spelling system to learn that "Analytiks" may sometimes be the correct or intended spelling by a user depending on the context in which it appears.

Furthermore, the task of managing a large dictionary to include different spellings can be burdensome and time consuming for users, especially if the users need to routinely search through multiple groups of documents that may each contain words that may not be found in typical general-purpose dictionaries. Typically, the user can manually add words into the dictionary database so that the spellcheck system will not generate an error for the added words in future instances. Typically, however, the option to add words into the dictionary database may only be offered to the user once the spellcheck system generates a spelling error message in the first place. Further, in many cases, traditional spellcheck systems do not typically update to account for new documents containing new words not already present in the dictionary. In other cases, words of interest are not accurately or intuitively categorized, requiring the user to perform additional navigation or keyword searching. Thus, the user frequently has to manually check and add unrecognized words into a dictionary database.

Contextual spelling methods and systems disclosed herein address these problems, allowing a system to utilize natural language processing to automatically provide spelling correction suggestions that take into account the context of words as they appear in various groups of documents. For example, in some embodiments described herein, the contextual spelling correction system may receive a user input comprising a string of characters, divide the user input into a plurality of n-grams, determine an n-gram frequency across a searchable domain of documents, determine a relevant group of documents and assign weights to dictionaries associated with the group of documents, and generate an overall spelling correction suggestion based at least partly on the weightings of the dictionaries.

As used herein, an "n-gram" or "ngram" generally refers to a string or set of one or more words in a fixed order. As is known in the art, a one word n-gram (i.e., n=1) may be referred to as a unigram, a two word n-gram (i.e., n=2) may be referred to as a bigram, and a three word n-gram (i.e., n=3) may be referred to as a trigram. A given sentence may include a number of unigrams, bigrams, trigrams and other n-grams (such as those for which 'n' is greater than three) within it. Some of these n-grams identified in source text may overlap each other in the source text, such that they share one or more words with each other. For example, in the sentence "This is a sample," each word may be a unigram, each two word set that appears together may be a bigram (e.g., "This is," "is a," and "a sample"), and each three word set that appears together may be a trigram (e.g., "This is a," and "is a sample").

There are many technical and practical benefits to utilizing the contextual spelling correction system and methods described herein. By determining the relevant logical group of documents within the entire searchable domain and assigning weights to dictionaries specific to the group of documents, the contextual spelling correction system may tailor spelling correction suggestions to the user input query rather than rely on a generic dictionary. For example, the contextual spelling correction system may receive a user input query "Analytiks analysis," find a group of documents related to Project Analytiks, and utilize a dictionary associated with Project Analytiks to recognize that "Analytiks" is not a misspelled word in the context of Project Analytiks. Furthermore, by automatically updating each time new documents are included into the searchable domain of documents, the contextual spelling correction system may avoid generating spelling error notifications on words that may be included in the new documents, thereby allowing for a successful detection of special words that may not exist in general dictionary databases. In contrast, other methods may need to manually define individual word spellings. By improving accuracy of user search queries and suggesting alternately spelled search terms, the techniques described herein significantly reduce the inefficiencies of various types of database navigation (including electronic catalog navigation in a network-based retail environment), allowing users to locate items or documents of interest with fewer steps.

FIG. 1 is an illustrative networked environment and system architecture of a contextual spelling correction system, according to some embodiments. The illustrative environment includes a user system 110, a network 115, a contextual spelling correction system 120, and a document access system 165. In some embodiments, user system 110 may be a computer, handheld mobile computing device, or other computing system. In some embodiments, a number of computing systems may each be used by a number of different users to submit documents or user input queries to document access system 165. In some embodiments, the documents may be stored on the user system 110 in document data store 112. In some embodiments, the documents stored in user system 110 may be transmitted remotely to document access system 165 over network 115. In some embodiments, document access system 165 may store received documents document data store 170. For example, in some embodiments, document access system 165 may be a cloud storage system for storing or backup up data securely on a remote server.

In some embodiments, contextual spelling correction system 120 may be in communication with document access system 165 to perform contextual spelling correction on documents stored in document data store 170. After documents are stored in document data store 170, the contextual spelling correction system 120 may utilize grouping module 130 to process the documents and group them into logical groups. As will be discussed later, in some embodiments the grouping module 130 may track word frequencies to group documents together. For example, two documents may be included together in a group because the documents share a large amount of words in common (e.g., all the words in Document 1 appear in Document 2). In other embodiments, documents may be grouped together into a logical group because certain words only appear in the documents in the same group. For example, two documents may be grouped together because the two documents are the only documents containing the word "Analytiks." In some embodiments, the logical groups may be suggested or indicated by a user either directly or indirectly. For example, actions that a user performs with respect to individual documents, such as placing them in the same file directory or applying a certain tag or metadata to documents, may be considered by the contextual spelling correction system to group documents.

Once the grouping module 130 groups documents in the searchable domain into one or more logical groups, dictionary module 150 may generate and associate one or more dictionaries to each logical group. For example, in some embodiments, a logical group relating to "Project Analytiks" may be associated with a dictionary recognizing "Analytiks" as a properly-spelled word. Additionally, in some embodiments, a global dictionary may be associated or applied to all logical groups in the searchable domain containing spellings of common words (such as a standard English language dictionary) that are not specific to any one logical group. Therefore, in some embodiments, each logical group of documents may be associated with a plurality of dictionaries. In some embodiments, each dictionary in the plurality of dictionaries may be updated or modified. For example, dictionaries may be modified whenever the contextual spelling correction system 120 detects a new set of documents in data access system 165. In some embodiments, the plurality of dictionaries may be stored in dictionary data store 180. For example, a logical group may be associated with a global dictionary containing spellings of words found in a standard English language dictionary, a unigram dictionary containing spellings of unigrams (e.g., single words) that appear in the documents in the logical group, a bigram dictionary containing spellings of bigrams (e.g., pairings of two words) that appear in documents in the logical group, and a trigram dictionary containing spellings of trigrams that appear in documents in the logical group.

In some embodiments, dictionary entries for each unigram, bigram, or trigram may be associated with a numeric value. For example, a unigram in a unigram dictionary may be associated with the number "35," indicating that the unigram appears 35 times across all documents in the logical group. In some embodiments, the numeric value may indicate the frequency in which a given unigram in the unigram dictionary appears across all documents in the logical group (e.g., the numeric value 35 indicates that the unigram appears in 35% of all documents in the logical group). It will be appreciated that, in other embodiments, the numeric value associated with an entry in a dictionary may represent other meanings, such as a score. Furthermore, in some embodiments the user may explicitly define a logical index or searchable domain of documents.

In some embodiments, weight adjustment module 160 may assign a weight to each of the plurality of dictionaries. In some embodiments, the weight value is a numerical value ranging from 0 to 1, where a higher weight may be associated with higher priority or influence in the contextual spelling method. For example, a global dictionary may be assigned a weight of 0.1, a unigram dictionary assigned a weight of 0.25, a bigram dictionary assigned a weight of 0.30, and a trigram dictionary assigned a weight of 0.40. Although dictionaries may be assigned with an initial weight value, weight values may change or fluctuate according to some embodiments. By way of example, given a user input search query of "Analytiks program development," weight adjustment module 160 may increase the weight of a trigram dictionary associated with the Project Analytiks group containing the proper spelling of "Analytiks" while lowering the weight of a global dictionary, unigram dictionary, or bigram dictionary associated with the same logical group. In some embodiments, contextual spelling correction system 120 may present a spelling correction suggestion of the user input based at least partly on the dictionary with the highest weight.

It will be appreciated that contextual spelling features described herein may be implemented in a number of different environments in that illustrated in FIG. 1. For example, modules illustrated as part of contextual spelling correction system 120 could instead be included within a user system, such as user system 110, such that the user system 110 may provide spelling suggestions as described herein without network accessibility or any external contextual spelling correction system. Similarly, modules illustrated as part of contextual spelling correction system 120 could instead be included within a variety of servers, network-accessible services or other systems that provide a variety of features in order to incorporate improved spelling functionality with such features.

Figure 2:
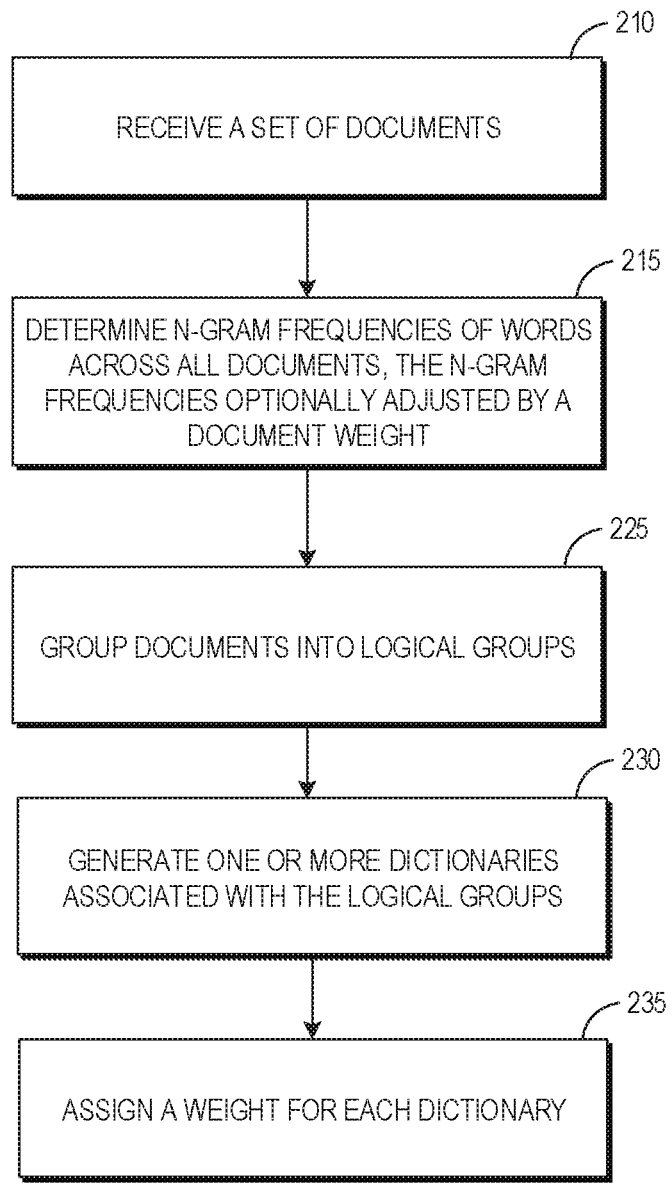
FIG. 2 is a flow diagram depicting an example method of initializing the contextual spelling correction system, according to some embodiments.

FIG. 2 is a flow diagram depicting an example method of initializing the contextual spelling correction system, according to some embodiments. Contextual spelling correction system 120 may first receive a set of documents in block 210. In block 215, contextual spelling correction system 120 may determine n-gram frequencies of all n-grams across all documents. For example, contextual system 120 may programmatically progress through text of a document to track the number of times that individual unigrams, bigrams, and trigrams in the document appear in the document. After processing all documents, the contextual spelling correction system 120 may total the number of times a unigram, bigram, or trigram appears across all documents. In one embodiment, the result may be a list of the unigrams, bigrams, or trigrams that appear in the documents, along with a count for each unigram, bigram, or trigram that indicates the number of times that given unigram, bigram, or trigram appears in the documents (e.g., "a 12, and 21, apple 1" may indicate that the unigram "a" appeared twelve times, the unigram "and" appeared 21 times, and the unigram "apple" appeared once).

It may be desirable to have the n-gram frequencies account for the importance of a document or set of documents. Therefore, in some embodiments, the n-gram frequencies may be adjusted based at least in part on a document weight assigned to a given document, such that appearances of a given n-gram in one document are given greater weight than appearances of the same n-gram in another document. In some embodiments, the document weight may be a numerical value in a range of values (e.g., a value between 1 to 100, or between 0.01 and 1.00). In some embodiments, the document weight for a given document may be determined by tracking a view count of the document. For example, a document that has been viewed 1,000 times will have a higher document weight than a document that has only been viewed ten times. Similarly in some embodiments, the document weight may be determined by tracking a number of clicks on (or selections of) the document, and a document with more clicks will be given a higher weight than a document with fewer clicks. In some embodiments, the n-gram frequency may be multiplied by the document weight to form an adjusted n-gram frequency. For example assuming the unigram "example" is associated with a unigram frequency of 5, the unigram frequency may be adjusted to 50 if the weight of the document in which "example" is found is 10. It will be appreciated that in some embodiments, the adjusted n-gram frequency may take into account the weights of multiple documents. By way of example, the document weight of all documents in the group may be added together to form a total document weight, which may then be multiplied by the numeric value associated with the particular n-gram.

The received set of documents may optionally be grouped into logical groups in block 225. In the example method of FIG. 2, the documents may be grouped based at least partly on the determined word frequencies of words within an individual document as well as the word frequencies across all documents. By way of example, contextual spelling correction system 120 may detect that Document One contains the word "Analytiks" and that only ten out of one hundred received documents mention the word "Analytiks" at least once. Therefore, grouping module 130 may group Document One with the other ten documents into one logical group. In another embodiment, contextual spelling correction system 120 may determine that the word "Analytiks" appears twenty times in Document One (where twenty may be a threshold determined based on average word frequency across a larger set of documents) and that the word appears at least twenty times in Document Two and Document Three. Therefore, grouping module 130 may group these three documents together into a logical group. In some embodiments, grouping may not necessarily be based on word frequencies. In some embodiments, grouping of documents may be done using natural language processing approaches. By way of example, contextual spelling correction system 120 may transform the strings of characters in documents into word vectors to analyze the semantic similarity of vectors and group semantically similar documents together into a logical group. In other embodiments, grouping module 130 may group documents together by detecting cross-references in the documents. For example, contextual spelling correction system 120 may group documents one and two together after detecting that document one contains a hyperlink to document two or that document one contains an explicit reference to document two. In some embodiments, block 225 may not occur within the illustrated method of FIG. 2, and instead the logical groups to which given dictionaries will be associated in block 230 below may be defined based on user input or actions, such as one or more users grouping documents into a directory, tagging or associating documents with each other, defining a searchable domain of documents, or some other document grouping.

In block 230, contextual spelling correction system 120 may generate one or more dictionaries associated with the logical groups. For example, a dictionary specific to the logical group relating to Project Analytiks may be generated and configured to contain the spellings of all words in each document in the Project Analytiks group. In some embodiments, each logical group may be associated with a plurality of dictionaries. By way of example, a global dictionary that does not contain spellings of all words contained in the grouped documents may nonetheless be associated with the Project Analytiks group because the dictionary contains many, but not all, of the words in grouped documents. In some embodiments, a logical group may also be associated with a unigram dictionary containing the spellings of all unigrams that appear in the documents of the logical group, a bigram dictionary containing the spellings of all bigrams that appear in the documents of the logical group, and a trigram dictionary containing the spellings of all trigrams that appear in the documents of the logical group. Although the example provides dictionaries for unigrams, bigrams, and trigrams, it will be appreciated that additional or fewer dictionaries may be included in other embodiments. In some embodiments, each entry in the dictionaries may be associated with a numeric value. For example, in some embodiments, the numeric value tracks the number of times a unigram, bigram, trigram, or other n-gram appears in a document. By way of example, a unigram dictionary may associate the entry "program" with the number 32, indicating that the unigram appears 32 times in the documents of the logical group. In other embodiments, the numeric value may represent the percentage of documents in the logical group containing the particular n-gram. For example, a bigram dictionary entry "image file" may be associated with the numeric value 10, indicating that the bigram appears in 10% of all documents in the logical group. It will be appreciated that, in other embodiments, the numeric value associated with an entry in a dictionary may represent a different value. In some embodiments, the numeric value associated with a unigram, bigram, or trigram may be adjusted to take into account the weight of a document. For example, as discussed above, the bigram frequency of a bigram may be multiplied by a document weight determined by the number of views of a given document.

In block 235 the contextual spelling correction system 120 may assign a weight for each dictionary from block 230. In some embodiments, the weight of a dictionary may be assigned an initial numerical value ranging from 0 to 1. For example, in some embodiments, a trigram dictionary may be given a higher weighting relative to a bigram dictionary because a trigram requires an ordered list of three words rather than the two words required for a bigram. For example, if an exact three word phrase entered by a user has appeared in many documents, that may be a stronger indicator of correct spelling of the three individual words than how often each of the individual words in isolation has appeared in documents. Similarly, in some embodiments, a bigram dictionary may be assigned a higher weight relative to a unigram dictionary, and the unigram dictionary may be assigned a weight higher than a global dictionary. In some embodiments, the global dictionary may be assigned the lowest weight because the global dictionary may only contain common English language words and may not contain unusual spellings relevant to the logical group. The weight of a dictionary may then be updated or modified to account for the receipt of new documents or in response to a user input query. In some embodiments, the weight of a dictionary may be adjusted according to feedback provided by a user. For example, the contextual spelling correction system 120 may present a first correction suggestion based on a spelling from a unigram dictionary and a second correction suggestion based on a spelling from a bigram dictionary. If the user selects the first correction suggestion, the contextual spelling correction system 120 may increase the weight of the unigram dictionary and decrease the weight of the bigram dictionary. If the user does not select either correction, then the weights of both the unigram and bigram dictionaries may be lowered. In some embodiments, the user may provide explicit feedback, such as selecting an option reading "I didn't mean that" or "No" when presented with a suggestion such as "Did you mean [suggestion]?"

Figure 3:
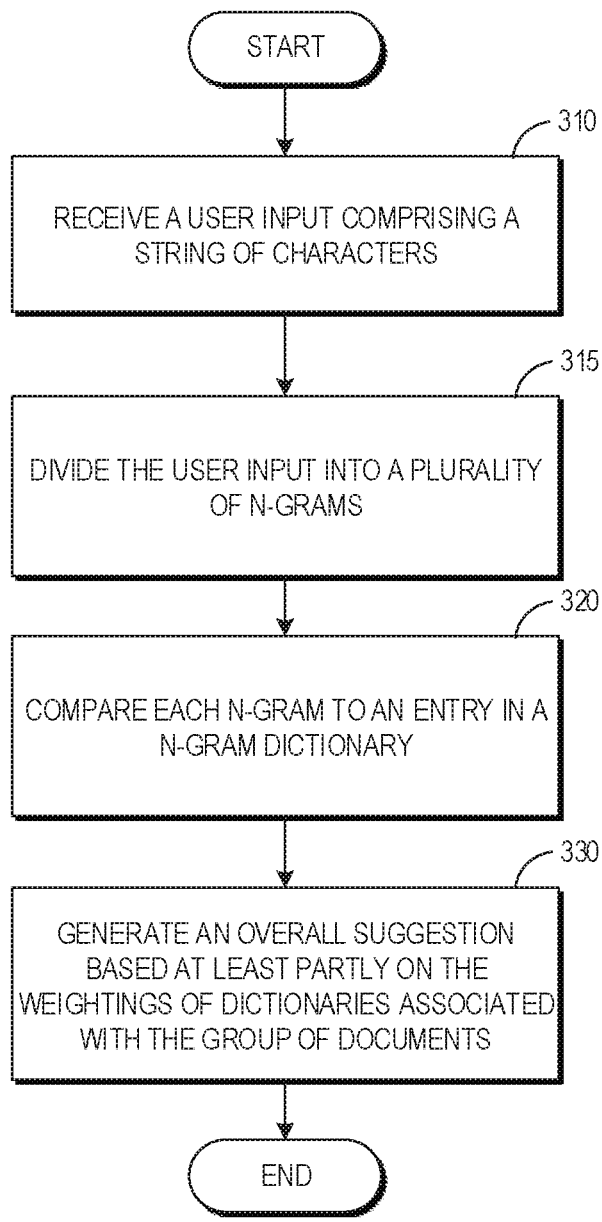
FIG. 3 is a flow diagram depicting an example method of generating contextual spelling suggestions, according to some embodiments.

FIG. 3 is a flow diagram depicting an example method of generating contextual spelling suggestions, according to some embodiments. In block 310, contextual spelling correction system 120 may receive a user input comprising a string of characters. For example, a user may enter a search query to search a set of documents stored remotely in a cloud storage system. In other embodiments, a user may be editing a text file accessed from and stored on a remote server. In some embodiments, the user input may be transmitted from user system 110 over network 115.

In block 315, contextual spelling correction system 120 may divide the user input into a plurality of n-grams. For example, in the sentence "This is a sample," each word may be a unigram, each two word set that appears together may be a bigram (e.g., "This is," "is a," and "a sample"), and each three word set that appears together may be a trigram (e.g., "This is a," and "is a sample").

In block 320, contextual spelling correction system 120 may compare each n-gram to an entry in a corresponding n-gram dictionary to determine a correction suggestion score for a spelling correction suggestion. By way of example, the user input "Analytiks analyzes imag file" may be divided into a number of bigrams (e.g., "Analytiks analyzes," "analyzes imag," and "imag file"). The contextual spelling correction system 120 may then compare each of the bigrams to entries in a local bigram dictionary associated with the logical group and/or to a global dictionary. In some embodiments, an n-gram may be compared to entries in multiple n-gram dictionaries. For example, the unigram "Analytiks" may be compared to unigrams in a unigram dictionary, bigrams in a bigram dictionary, and trigrams in a trigram dictionary. Similarly, in some embodiments a bigram may be compared to unigrams in a unigram dictionary, bigrams in a bigram dictionary, and trigrams in a trigram dictionary. Accordingly, the contextual spelling correction system 120 may be configured in a manner such that in certain instances it may suggest a bigram in place of a user-entered unigram (e.g., suggesting "Project Analytiks" instead of user-entered "projectanalytiks") or suggest a unigram in place of a user-entered bigram (e.g., suggesting "fileorama" instead of user-entered "file rama"). As will be discussed in block 330, the contextual spelling correction system may use the comparisons to generate scores for potential spelling correction suggestions.

In block 330, contextual spelling correction system 120 may generate a spelling correction suggestion based at least partly on the weightings of the dictionaries associated with the group of documents. For example, in some embodiments a user input may be parsed into multiple unigrams, bigrams, and/or trigrams. The contextual spelling correction system may refer to a local unigram dictionary in the logical group to compare a parsed unigram with unigrams stored in a local unigram dictionary associated with the logical group. Each entry in the local unigram dictionary may be a unigram associated with a numerical value. In some embodiments, the numerical value associated with the unigrams stored in the local unigram dictionary may represent the number of times the unigram appears across all documents in the logical group. In some embodiments, the contextual spelling correction system may assign a score to potential spelling correction suggestions. In some embodiments, the score of a spelling correction suggestion may be based at least partly on the degree of match between the parsed n-gram and an entry in a corresponding n-gram dictionary associated with the logical group. For example, if the contextual spelling system detects an exact match between a parsed unigram and a unigram in the local unigram dictionary, the system may assign a high score to the unigram in the local unigram dictionary.

In some embodiments, the score of a correction suggestion may be based on a word frequency associated with an entry in the dictionary and may further be based on the weight of the dictionary itself. For example, if "project analytics" is associated with the number "1" in a global bigram dictionary and "project Analytiks" is associated with the number "42" in a local bigram dictionary associated with the logical group, the contextual spelling correction system may assign a higher score to "project Analytiks." In some embodiments, the contextual spelling correction system may instead assign a higher score to "project analytics" if the global bigram dictionary itself has a weight of 1 and the local bigram dictionary has a weight of 0. In some embodiments, the score of a spelling correction suggestion may also be based on the degree of edits required to match a parsed n-gram with an entry in a dictionary. In some embodiments, the degree of edits may be measured by Levenshtein distance. For example, even if "image fileorama" appears in a local bigram dictionary and has a high frequency number associated with it, the score of the suggestion may be diminished for the user input "image file" because the Levenshtein distance between the two strings is 5.

In some embodiments, the score of a suggestion may be adjusted if there is not a perfect match between the spelling correction suggestion and the user input. For example, the system may perform a division operation on the score of a correction suggestion based on an edit distance. By way of example, if a first correction suggestion has a score of 20, but the Levenshtein distance or other edit distance between the correction suggestion and user input is 2, then the score of the first correction suggestion will be adjusted to 10 by performing a division operation on the score, 20, by the edit distance, 2. In some embodiments, each correction suggestion may have a score based on a word or n-gram frequency, edit distance, and weight of each dictionary. For example, in some embodiments, the score for a correction suggestion may be calculated as $((f*w)/d)$, where f is the frequency or other numeric value associated with the n-gram in an n-gram dictionary, w is the weight of the n-gram dictionary, and d is the edit distance between the entered word and the given n-gram in the dictionary. The contextual spelling correction system may rank all possible correction suggestions based on the determined score and present the correction suggestions in order based on the score. In some embodiments, the contextual spelling correction system may present only the suggestions with a score exceeding a threshold value.

In some embodiments, documents within a logical group may be ranked so that the contextual spelling correction system may determine which document to base its spelling suggestions on. For example, a document titled "Master Document" may be ranked more highly than any other document in the logical group, indicating that the master document most likely has the most accurate and correct spelling of any given word. In some embodiments, a PageRank algorithm may be used in ranking the pages based on cross-references between documents. In other embodiments, additional data considered in ranking may include how recently a document was edited, how many times it has been accessed, the identity of the author, etc. The spelling correction suggestion may also utilize n-grams to examine how often a word is spelled a particular way in view of another nearby word. For example, a local trigram dictionary associated with the logical group may contain the the trigram "Analytiks analyzes images" and track that it appears commonly throughout the logical group (e.g., through a numerical value associated with the trigram entry in the trigram dictionary) and that "image" and "files" frequently appear together as the bigram "image files" by examining entries in a bigram dictionary associated with the logical group. In some embodiments, the contextual spelling correction system may also consider the degree of edits required to convert a parsed user input with an entry in a dictionary associated with the logical group. Therefore, contextual spelling correction system 120 may receive user input "Analytiks analyzes imag file" and generate a spelling correction suggestion "Analytiks analyzes image files." In some embodiments, the spelling correction suggestion may be generated and transmitted directly to the user system. In other embodiments, the contextual spelling correction system 120 may also store the correction suggestion in a data store.

Figure 4:
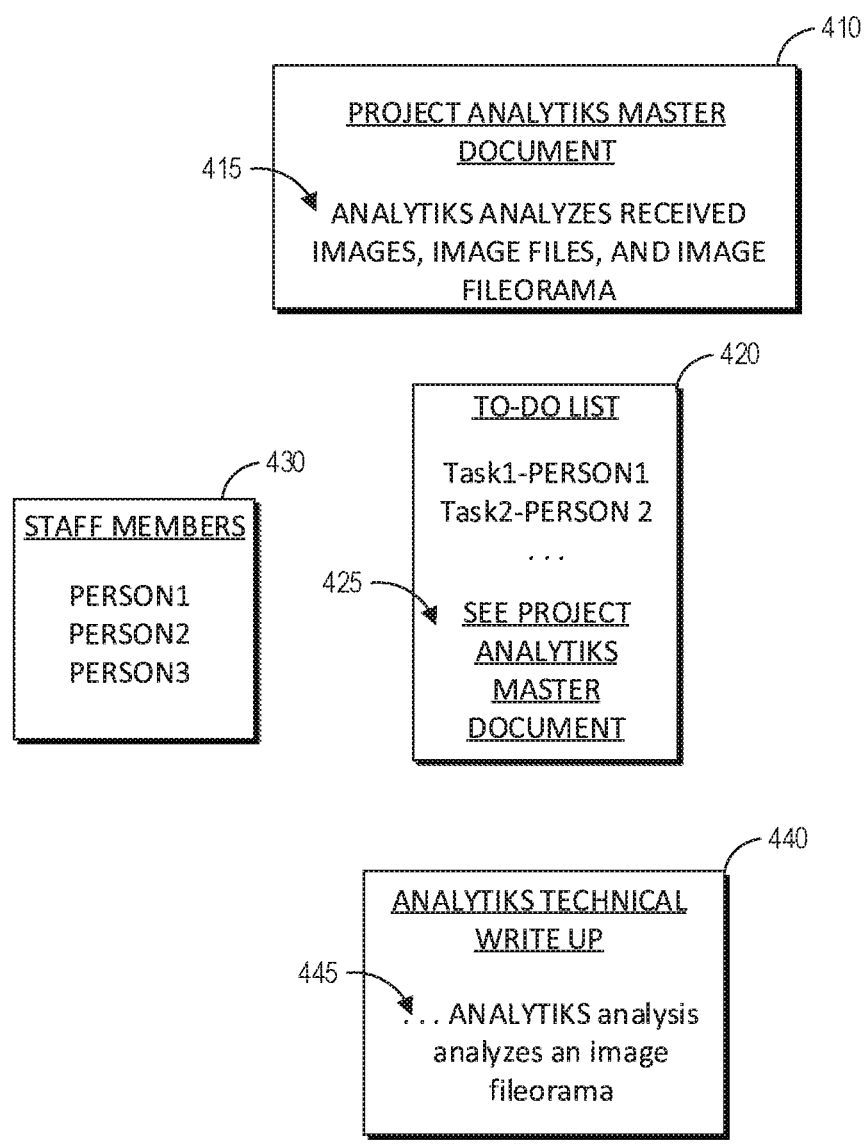
FIG. 4 is a visual representation of an example domain of documents utilized by the contextual spelling correction system, according to some embodiments.

FIG. 4 is a visual representation of an example domain of documents utilized by the contextual spelling correction system, according to some embodiments. In the example of FIG. 4, documents 410, 420, 430, and 440 all grouped together into a single logical group related to Project Analytiks. Document 410 is a master document containing important information regarding Project Analytiks. In some embodiments, document 410 may contain alphanumeric text descriptions and references to related documents. For example, description 415 provides a high-level overview of the project which may be used as reference for proper spellings in contextual dictionaries associated with the logical group. In some embodiments, document 410 may be ranked more highly than documents 420, 430, and 440 because document 410 is referred to as the master document, thereby acting as a likely source of proper spellings for any given word in the logical group. In other embodiments, the various documents may be ranked differently. In some embodiments, the documents in a logical group may be ranked based at least partly on the user input. For example, while master document 410 may ordinarily be given the highest rank, document 440 may be given the higher rank if the user input is "Analytiks technical write up." Document 420 is a list cataloging tasks that may need to be accomplished for the project. Hyperlink 420 is a URL link directing the user back to master document 410. Document 430 is a list of personnel working on Project Analytiks. While document 430 does not have an explicit reference to the term "Analytiks," document 430 may still be included in the logical group because PERSON1, PERSON2, and PERSON3 appear in document 420. Document 440 lists technical details or descriptions relating to Project Analytiks and may be included in the logical group for direct inclusion of the term "Analytiks." Phrase 445 contains the trigram "ANALYTIKS analysis analyzes" which may be used as reference to provide spelling correction suggestions.

Figure 5:
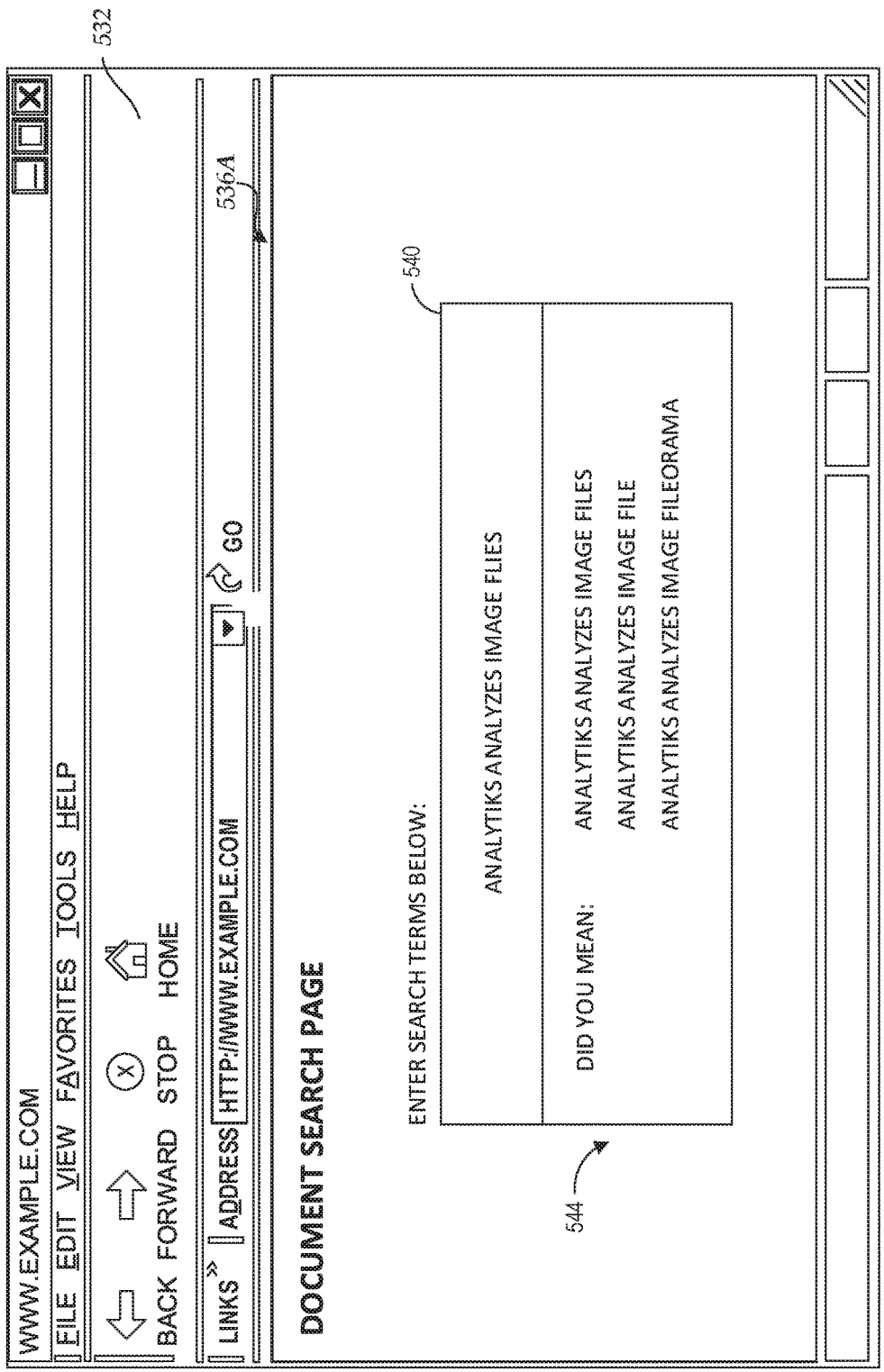
FIG. 5 is an example of a representation of a network page displayed on a user system, such as the user system of FIG. 1, which provides spelling suggestions based on user-submitted text.

FIG. 5 is an example of a representation of a network page displayed on a user system, such as the user system of FIG. 1. The network page 536A may be displayed within the user interface of the browser application 532 of the user system 110. The user utilizing the user system 110 in this instance may be, for example, a lead project manager who desires to search for a document. As illustrated in FIG. 5, the network page 536A includes a text box 540 for a user to input a search query. For example, the user has indicated that the user would like the system to search for documents relating to the search query "Analytiks analyzes imag fileo" that the user has typed into box 540. Contextual spelling correction system 120 may receive the user input in box 540 and transmit spelling correction suggestions to the user system 110 through suggestion box 544. By utilizing the method described earlier in connection to FIGS. 3 and 4, the contextual spelling correction system 120 may detect inadvertent typographical errors in the user input by referring to one or more dictionaries associated with a logical group For example, the contextual spelling correction system 120 may detect that there are no bigrams for "image flies" but that there are many bigrams for "image file," "image files," or "image fileorama" throughout the documents in the logical group. Therefore, the contextual spelling correction system 120 may generate and transmit appropriate suggestions in view of the wording in the logical group documents.

Figure 6:
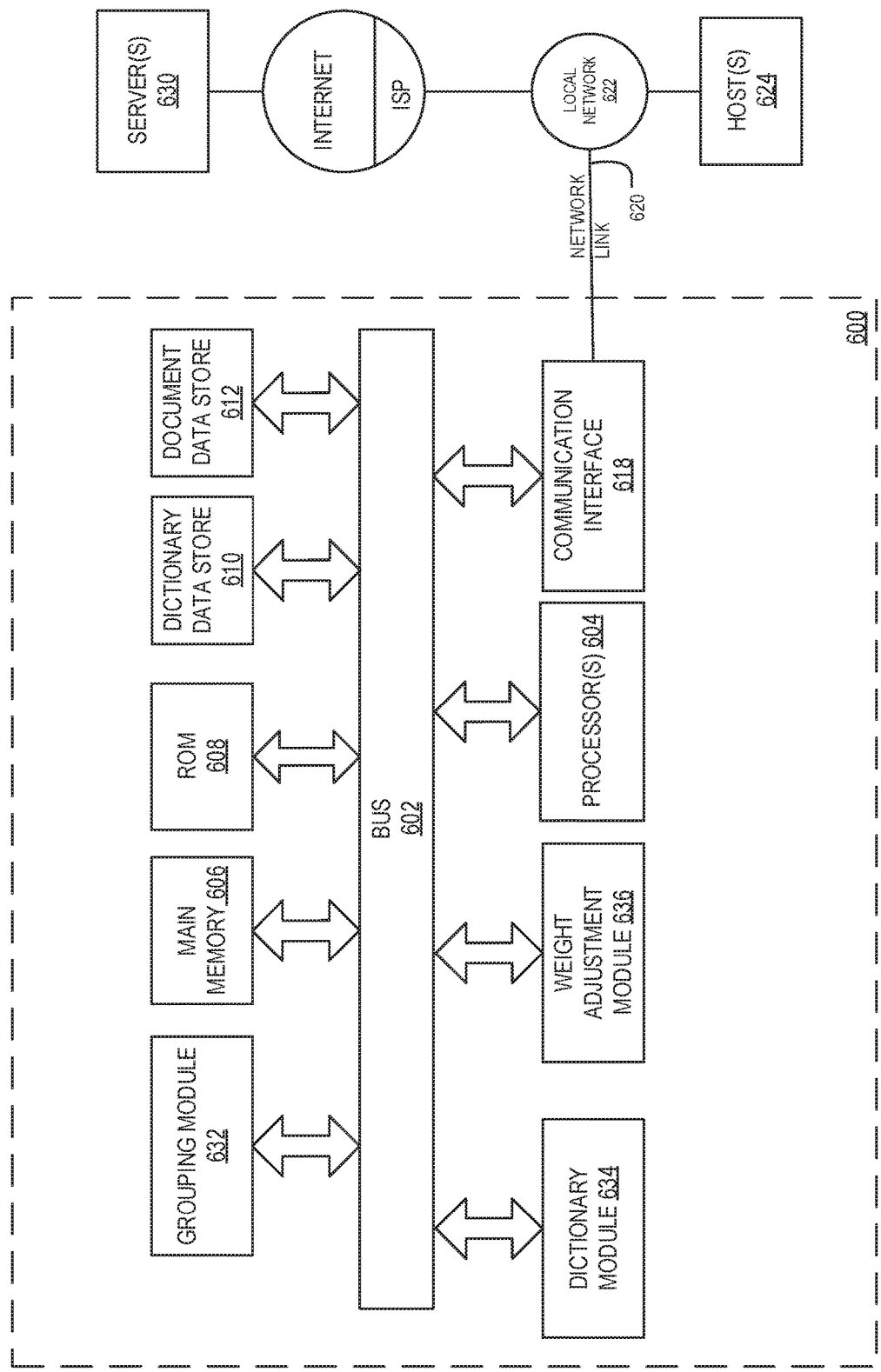
FIG. 6 is a diagram of an example computing system configured to perform contextual spelling analysis described herein.

FIG. 6 is a block diagram of an illustrative computing system that may implement one or more of the features described. The computing system 600 may be configured to perform all or some of the features of the contextual spelling correction system 120. The computing system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

The computing system 600 also includes a main memory 606, such as a random access memory (RAM), cache, or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render the computing system 600 into a special-purpose machine that is customized to perform the operations specified in the instructions.

The computing system 600 further includes a read only memory (ROM) 608 or other static storage device coupled to bus 602 for storing static information and instructions for processor 604. Dictionary and document data storage devices 610 and 612, such as a magnetic disks, optical disks, or USB thumb drives (Flash drives), etc., are provided and coupled to bus 602 for storing information and instructions.

The computing system 600 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 600 to be a special-purpose machine. According to one embodiment, the techniques herein may be performed by the computing system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

As part of a special-purpose machine, the computing system 600 may include grouping module 632, dictionary module 634, and weight adjustment module 636. According to one embodiment, grouping module 632 may receive a set of documents and group them according to natural language processing techniques or by determining word frequencies in the documents. In some embodiments, dictionary module 634 and weight adjustment module 636 may respectively generate one or more dictionaries associated with the one or more groups of documents and assign weight values to the dictionaries. Documents and dictionaries utilized by modules 632, 634, and 636 may be stored in data stores 610 and 612. According to one embodiment, instructions may be transmitted through communication interface 618 to one or more servers 630. The instructions transmitted may be stored in ROM 608 in one embodiment.

Various forms of computer readable storage media may be involved in carrying one or more sequences of one or more computer readable program instructions to processor 604 for execution. For example, the instructions may initially be carried on a magnetic disk or solid state drive of a remote computer. The bus 602 may carry data to main memory 606, from which processor 604 retrieves and executes the instructions.

The computing system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the Internet 628 to a server 630.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a c system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A contextual spelling correction system can be or include a microprocessor, but in the alternative, the contextual spelling correction system can be or include a controller, microcontroller, or state machine, combinations of the same. A contextual spelling correction system can include electrical circuitry configured to process computer-executable instructions. Although described herein primarily with respect to digital technology, a contextual spelling correction system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a contextual spelling correction system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the contextual spelling correction system such that the contextual spelling correction system can read information from, and write information to, the storage medium. In the alternative, the storage medium can be integral to the contextual spelling correction system. The contextual spelling correction system and the storage medium can reside in an ASIC. The ASIC can reside in a user terminal. In the alternative, the contextual spelling correction system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a memory storing computer-executable instructions; and
    one or more hardware processors in communication with the memory and configured by the executable instructions to at least:
        obtain a plurality of documents including a first document and a second document, the first document and second document each comprising a plurality of words;
        determine first document word frequency information, wherein the first document word frequency information indicates, for an individual word in the first document, a number of times that the individual word appears in the first document;
        determine overall word frequency information, wherein the overall word frequency information indicates, for the individual word in the first document, a number of times that the individual word appears across a plurality of documents;
        group the first document and the second document into a logical group based at least partly on the first document word frequency information and overall word frequency information;
        generate two or more dictionaries associated with the logical group, the two or more dictionaries comprising:
            a first dictionary for the logical group, wherein a first weight is assigned to the first dictionary for the logical group, the first dictionary comprising a list of unigrams appearing in documents of the logical group, wherein a unigram in the list of unigrams is associated with a unigram frequency value associated with how many times the unigram appears in documents of the logical group;
            a second dictionary for the logical group, wherein a second weight is assigned to the second dictionary for the logical group, the second dictionary comprising a list of bigrams appearing in documents of the logical group, wherein a bigram in the list of bigrams is associated with a bigram frequency value associated with how many times the bigram appears in documents of the logical group;
        receive an input string of characters, the input string of characters representing an input query entered by a user to search documents within at least the logical group;

generate a plurality of n-grams from the input string of characters, an n-gram of the plurality of n-grams comprising an ordered sequence of characters, the plurality of n-grams including a first entered unigram and a first entered bigram;

compare the first entered unigram to a unigram in the list of unigrams in the first dictionary;

determine a unigram suggestion score based at least partly on the unigram frequency value associated with the unigram, a unigram edit distance between the first entered unigram and the unigram, and the first weight assigned to the first dictionary for the logical group;

compare the first entered bigram to a bigram in the list of bigrams in the second dictionary;

determine a bigram suggestion score based at least partly on the bigram frequency value associated with the bigram, a bigram edit distance between the first entered bigram and the bigram, and the second weight assigned to the second dictionary for the logical group, wherein the second weight assigned to the second dictionary is different than the first weight assigned to the first dictionary;

generate a spelling correction suggestion regarding the input string, the spelling correction suggestion including at least one of the unigram or the bigram, wherein the spelling correction suggestion is based at least partly on the unigram suggestion score and the bigram suggestion score; and correct the input string based at least partly on the correction suggestion.

2. The system of claim 1, wherein the one or more hardware processors are further configured to group a subset of the plurality of documents other than the first document and second document into a second logical group.

3. The system of claim 2, wherein the second logical group is associated with a third dictionary comprising a list of unigrams appearing in documents of the second logical group.

4. A system comprising:
a memory storing computer-executable instructions; and
one or more hardware processors in communication with the memory and configured by the executable instructions to at least:
generate two or more dictionaries associated with a plurality of documents, the two or more dictionaries comprising:
a first dictionary for the plurality of documents, wherein a first weight is assigned to the first dictionary for the plurality of documents, the first dictionary comprising a list of unigrams appearing in the plurality of documents, wherein a unigram in the list of unigrams is associated with a corresponding numeric value stored in the first dictionary; and
a second dictionary for the plurality of documents, wherein a second weight is assigned to the second dictionary for the plurality of documents, the second dictionary comprising a list of bigrams appearing in the plurality of documents, wherein a bigram in the list of bigrams is associated with a corresponding numeric value stored in the second dictionary;
receive an input comprising a string of characters;
generate a plurality of n-grams from the input, an n-gram of the plurality of n-grams comprising an ordered sequence of characters appearing in the input, the plurality of n-grams including a first entered unigram and a first entered bigram;
compare the first entered unigram to a unigram in the list of unigrams in the first dictionary;
determine a unigram suggestion score based at least partly on a numeric value associated with the unigram in the first dictionary, an edit distance between the first entered unigram and the unigram, and the first weight assigned to the first dictionary for the plurality of documents;
compare the first entered bigram to a bigram in the list of bigrams in the second dictionary;
determine a bigram suggestion score based at least partly on a numeric value associated with the bigram in the second dictionary, a bigram edit distance between the first entered bigram and the bigram, and the second weight assigned to the second dictionary for the plurality of documents, wherein the second weight assigned to the second dictionary is different than the first weight assigned to the first dictionary; and
generate a correction suggestion regarding the input, the correction suggestion including at least one of the unigram or the bigram, wherein the correction suggestion is based at least partly on the unigram suggestion score and the bigram suggestion score.

5. The system of claim 4, wherein the plurality of documents each comprise strings of alphanumeric text, wherein the unigrams are words, and wherein the bigrams are pairs of words.

6. The system of claim 4, wherein the plurality of documents are defined as a logical group, wherein the logical group is formed at least in part by applying natural language processing techniques to at least the plurality of documents.

7. The system of claim 6, wherein the logical group is formed based in further part on cross-references in individual documents of the plurality of documents to other documents of the plurality of documents.

8. The system of claim 4, further comprising receiving a contextual search domain from a user, wherein the contextual search domain affects which documents are utilized by the system in generating the correction suggestion.

9. The system of claim 4, wherein the one or more hardware processors are further configured to update the first dictionary and the second dictionary based on a new document added to a searchable domain associated with the plurality of documents.

10. The system of claim 4, wherein the numeric value associated with the unigram in the first dictionary indicates one of (a) how many times the unigram appears in the plurality of documents or (b) a percentage of the plurality of documents that contain the unigram.

11. The system of claim 4, wherein the numeric value associated with the bigram in the second dictionary is a score determined based at least in part on a frequency with which the bigram appears in the plurality of documents.

12. The system of claim 4, wherein the plurality of n-grams comprise contiguous, non-overlapping sequences of characters from the input.

13. The system of claim 4, wherein the plurality of n-grams comprises unigrams, bigrams, and trigrams, wherein the one or more hardware processors are further configured to generate a third dictionary comprising trigrams appearing in the plurality of documents.

14. The system of claim 4, wherein the correction suggestion is based at least in further part on a global dictionary that is generated without regard to content of the plurality of documents.

15. A computer-implemented method comprising:
obtaining two or more dictionaries associated with a plurality of documents, the two or more dictionaries comprising:
- a first dictionary for the plurality of documents, the first dictionary comprising a list of unigrams appearing in the plurality of documents, wherein a unigram in the list of unigrams is associated with a corresponding numeric value stored in the first dictionary; and
- a second dictionary for the plurality of documents, the second dictionary comprising a list of bigrams appearing in the plurality of documents, wherein a bigram in the list of bigrams is associated with a corresponding numeric value stored in the second dictionary;

obtaining a global dictionary generated without regard to content of the plurality of documents;
receiving an input comprising a string of characters;
generating a plurality of n-grams from the input, an n-gram of the plurality of n-grams comprising an ordered sequence of characters appearing in the input, the plurality of n-grams including a first entered unigram and a first entered bigram;
performing comparisons of (a) the first entered unigram to one or more unigrams in the first dictionary for the plurality of documents, (b) the first entered bigram to one or more bigrams in the second dictionary for the plurality of documents, and (c) the first entered unigram to one or more entries in the global dictionary; and
generating a spelling correction suggestion regarding the input, the spelling correction suggestion based at least partly on the comparisons and respective weights associated with assigned to the first dictionary for the plurality of documents, the second dictionary for the plurality of documents, and the global dictionary.

16. The computer-implemented method of claim 15, further comprising associating each document of the plurality of documents with a rank.

17. The computer-implemented method of claim 16, wherein a first numeric value stored in the first dictionary in association with a first unigram is based at least in part on ranks of individual documents in which the first unigram appears.

18. The computer-implemented method of claim 15, wherein the input is associated with a search request to search the plurality of documents.

19. The computer-implemented method of claim 15, wherein the first dictionary and second dictionary are each assigned higher weights than the global dictionary.

20. The computer-implemented method of claim 15, further comprising performing comparisons of (d) the first entered unigram to one or more bigrams in the second dictionary, and (e) the first entered bigram to one or more unigrams in the first dictionary.

* * * * *